United States Patent [19]
Glenn

[11] Patent Number: 5,369,921
[45] Date of Patent: Dec. 6, 1994

[54] PORTABLE STAIRWAY RAILING DEVICE

[76] Inventor: Derrick Glenn, 3593 Hastings Dr., Fayetteville, N.C. 28311

[21] Appl. No.: 933,077

[22] Filed: Aug. 17, 1992

[51] Int. Cl.[5] .................................... E04F 11/18
[52] U.S. Cl. .................................... 52/182; 52/183; 52/79.6; 52/126.1; 256/67; 182/113
[58] Field of Search ................ 52/79.6, 126.1, 182, 52/183; 135/67; 256/59, 65, 67; 182/113

[56] References Cited
U.S. PATENT DOCUMENTS 3,421,529 1/1969 Vestal .................................... 135/67
3,455,313 7/1969 King .................................... 135/67
4,094,331 6/1978 Rozsa .................................... 135/67

Primary Examiner—Carl D. Friedman
Assistant Examiner—Christopher-Todd Kent

[57] ABSTRACT

A portable stairway railing device is disclosed comprising a frame structure having several support braces attachable to the stairway surface at the rearward section of the individual step. The support braces allow for selective variance of the width, depth, and height for fitting variously sized stairways. On the top portion of the frame structure is disposed a hand rail.

1 Claim, 2 Drawing Sheets

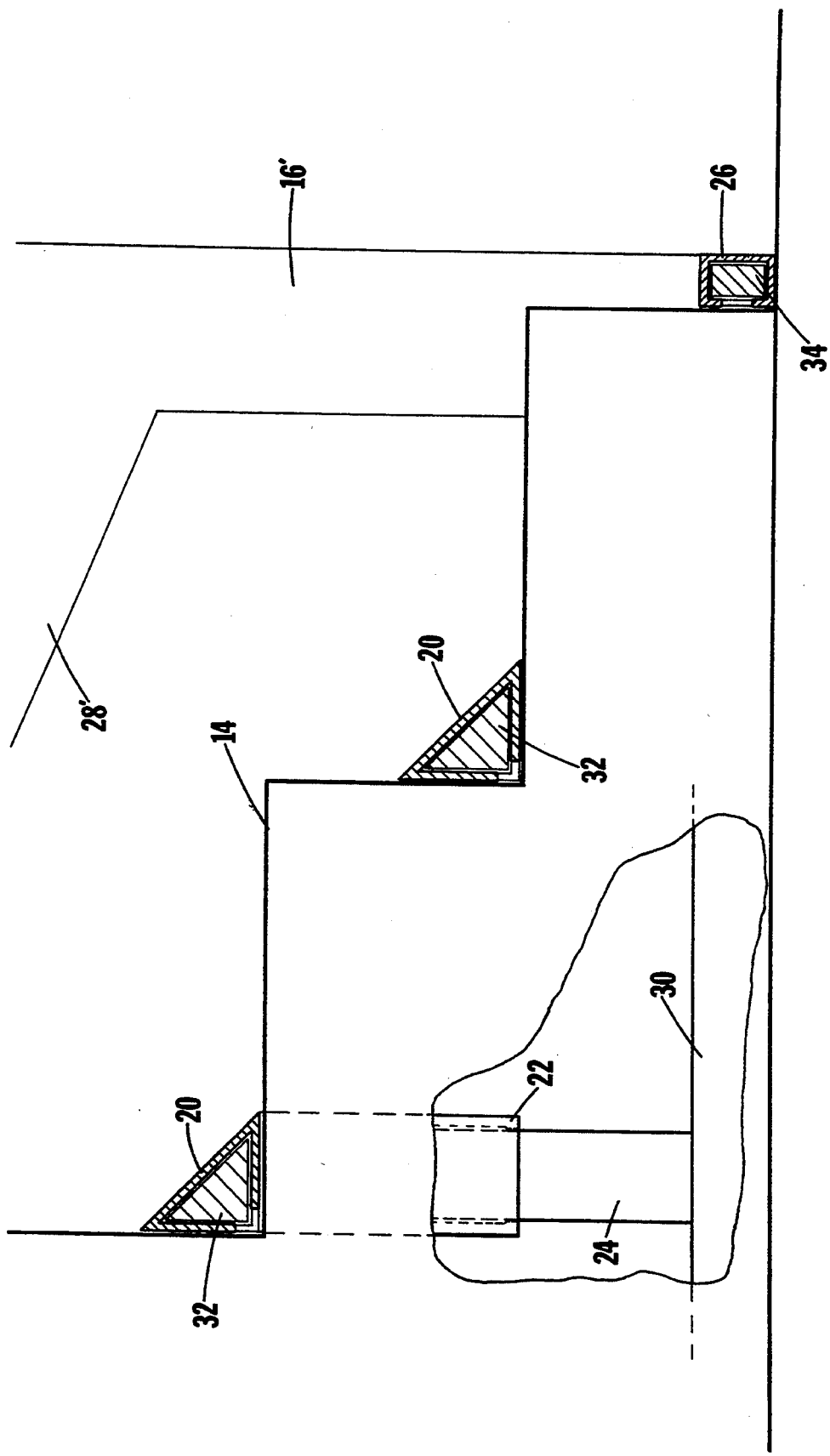

PORTABLE STAIRWAY RAILING DEVICE

SUMMARY OF THE INVENTION

A portable stairway railing device is disclosed that can be situated over outside stairways, more specifically, mobile home stairways, without having to bolt or cement railings into place. The body of the railing device comprises of forward and rearward posts, making up the frame. Each forward and rearward post is connected by a bottom bar support, a middle bar support, and a handrail. Disposed along the bottom support are height adjustable posts. These adjustable posts are attached to braces, positioned at the back of each step, excluding the topmost step. The braces allow selective adjustments to the width of the stairway.

It is an object and advantage of the present invention to provide a portable stairway railing device.

It is another object and advantage of the present invention to provide an improved portable stairway railing device.

It is yet another object and advantage of the present invention to provide a portable stairway railing device that attaches to a stairway without bolting or cementing the device to the ground or to the stairway itself.

It is still another object and advantage of the present invention to provide a portable stairway railing device that may allow the user to selectively vary the width of the device for different sized steps.

It is still another object and advantage of the present invention to provide a portable stairway railing device that may allow the user to selectively vary the depth of the device for different sized steps.

It is still another object and advantage of the present invention to provide a portable stairway railing device that may allow the user to selectively vary the height of the device for different sized steps.

It is a further object and advantage of the present invention to provide a portable stairway railing device that is simple to adjust to the user's particular stairway size.

It is yet a further object and advantage of the present invention to provide a portable stairway railing device that is easy to assemble and use.

Other objects, advantages, and features of the present invention will become apparent from the following detailed description of one embodiment, presented in conjunction with the accompanying drawings.

BRIEF DESCRIPTION OF THE DRAWINGS

Although the characteristic features of the present invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is an exploded side sectional view of the present invention with a partial cutaway of the stairs to illustrate the side supports.

DETAILED DESCRIPTION OF THE DRAWINGS

Figure 1:
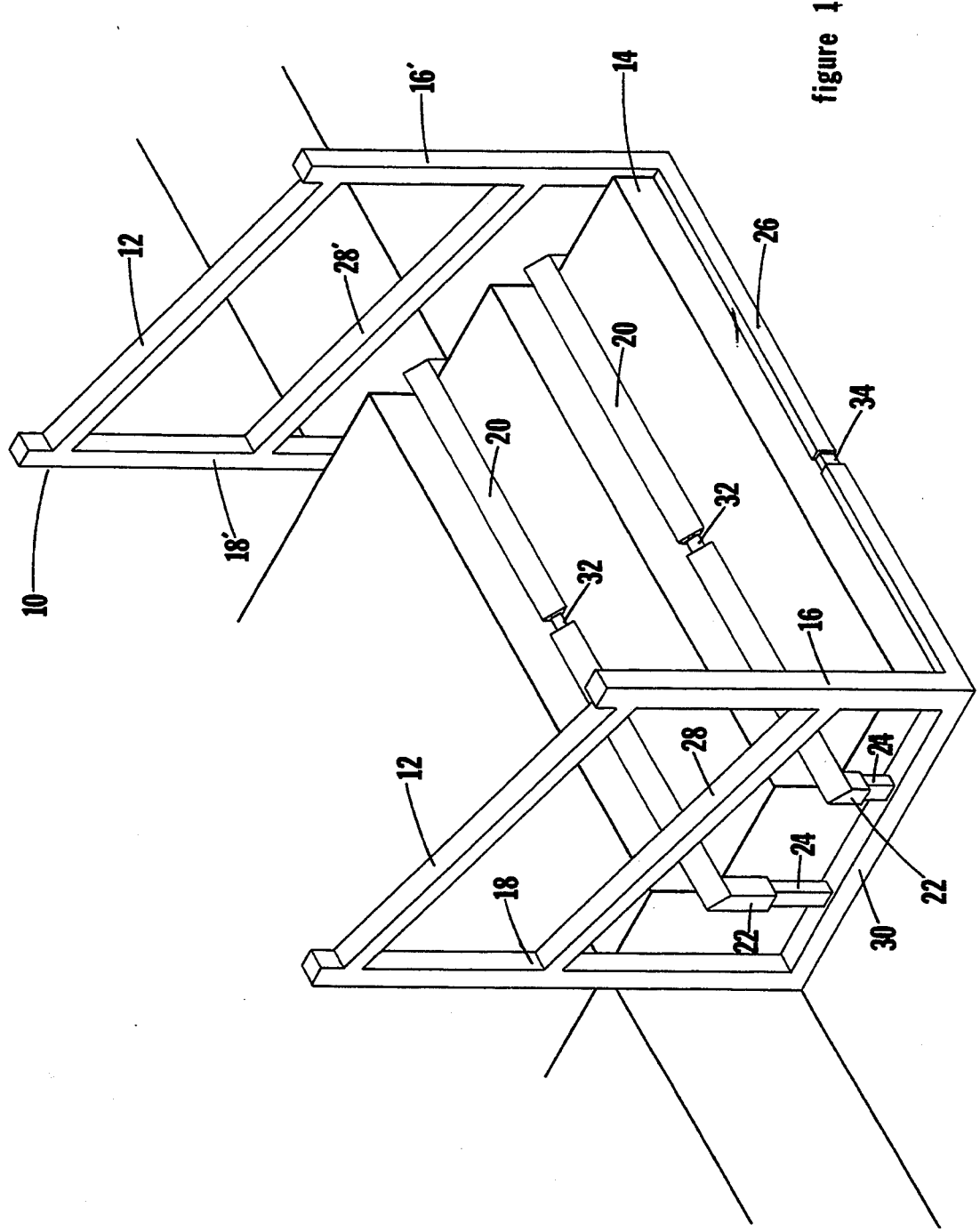
FIG. 1 is a perspective view of the present invention.

While the present invention will be described fully hereinafter with reference to the accompanying drawings, in which a particular embodiment is shown, it is to be understood at the outset that persons skilled in the art may modify the invention herein described while still acheiving the desired results of this invention. Accordingly, the description which follows is to be understood as a broad informative disclosure directed to persons of skill in the appropriate arts and not as limitation upon the present invention.

In FIG. 1, the portable stairway railing device is generally referred to by the numeral 10. The railing device 10 comprises forward support columns 16, rearward support columns 18, side bottom crossbars 30, step bracers 20, a hand rail 12, a lower rail 28, and a forward crossbar 26. The forward column 16 and the rearward column 18 are securely attached at their respective bases to the side bottom crossbars 30. The side crossbars 30 are horizontally positioned to the ground surface. Securing the middle section of the forward column 16 and the rearward column 18 is the lower rail 28. Disposed above the lower rail 28 is the hand rail 12. The portion between the lower rail 28 and the hand rail 12 can be utilized for a variety of designs. Extending vertically from the side crossbars 30 are posts 24. The side crossbar 30 and the posts 24 are parallel with the side of the stairway. Disposed at the rear of step surface 14 are width adjustable step bracers 20. The posts 24 are connected to the step bracers 20 by hollow vertical extensions 22 which receive the posts 24 through an apertured channel slightly larger than the thickness of the posts 24. The step bracers 20 are hollow elongated members separated in the middle, with a rod 32 disposed through the interior to allow selective adjustability (FIG. 2).

The forward support columns 16 are connected frontally by an adjustable forward crossbar 26. The forward crossbar 26 is a hollow elongated member separated in the middle, with a similarly configured rod 34 extending through the middle to allow selective adjustability (FIG. 2).

The portable stairway railing device 10 is over the step surfaces 14 of the stairway and positioned so that the step bracers 20 engage the most rear portion of the step surface 14 and side crossbars 30 and the posts 24 are flush against the sides of the stairway. The step bracers 20 provide extra stability to the railing device 10 and the adjustability of the height, width of the railing device 10 allows for accommodation of variously sized stairways.

The portable stairway railing device 10 is preferably constructed of a durable, lightweight, weatherproofed material.

Again, the preceding description is to be understood as a broad informative disclosure directed to persons of skill in the appropriate arts and not as limitation upon the present invention.

I claim:

1. A portable adjustable stairway railing device for providing a hand rail for stairways having different widths and rises, said portable stairway railing device comprising:

a framework defined by a forward horizontal crossbar and a pair of rearwardly extending horizontal sidebars, each of said pair of horizontal sidebars extending orthogonally from opposite ends of the forward horizontal crossbar, said framework adapted to rest on a generally flat, horizontal surface at the base of a stairway;

a pair of vertical forward support columns attached to opposite ends of said forward horizontal crossbar;

a pair of vertical rearward support columns attached to ends of each of said pair of horizontal sidebars opposite said forward horizontal crossbar;

a pair of hand rails diagonally connecting each of said pair of vertical forward support columns to each adjacent one of said pair of said rearward support columns;

a plurality of step bracers connecting said pair of horizontal sidebars, said step bracers adapted to rest on treads of the stairway, said step bracers being vertically adjustable to accommodate stairways having different rises, and said step bracers being horizontally adjustable to accommodate stairways having different widths.

* * * * *